United States Patent [19]

Lawless et al.

[11] 4,216,270

[45] Aug. 5, 1980

[54] MACHINE PARTS OF POWDERED METAL

[75] Inventors: Gregory D. Lawless, Oconomowoc, Wis.; Joel S. Hirschhorn, Washington, D.C.; Phillip J. Andersen, Cleveland Heights, Ohio

[73] Assignee: Abex Corporation, New York, N.Y.

[21] Appl. No.: 969,144

[22] Filed: Dec. 13, 1978

[51] Int. Cl.² ............................................. B22F 5/00
[52] U.S. Cl. .................................... 428/567; 252/12; 252/26
[58] Field of Search ..................... 428/567; 252/12, 26

[56] References Cited

U.S. PATENT DOCUMENTS

| 3,337,338 | 8/1967 | Krock | 75/208 R |
|---|---|---|---|
| 3,361,666 | 1/1968 | Webb | 252/26 |
| 3,671,207 | 6/1972 | Lynch et al. | 75/171 |
| 3,912,503 | 10/1975 | Schumacker et al. | 75/125 |
| 4,123,265 | 10/1978 | Takahashi et al. | 428/567 |

*Primary Examiner*—Brooks H. Hunt
*Attorney, Agent, or Firm*—Kinzer, Plyer, Dorn & McEachran

[57] ABSTRACT

A non-galling machine part, especially one to be mated to an opposed part of stainless steel, and consisting essentially of sintered stainless steel having interconnected porosity impregnated with bismuth or a bismuth-rich alloy such as bismuth-tin eutectic.

7 Claims, 2 Drawing Figures

MACHINE PARTS OF POWDERED METAL

BACKGROUND OF THE INVENTION

In the manufacture of chemical and food handling machinery incorporating component parts which function in movable metal to metal contact, it is often necessary to have material combinations that are at once corrosion resistant to the environment and exhibit non-galling and wear resistant properties. Of particular importance are parts such as pump impellers, pistons, sleeves, and bearings where sliding metal contact occurs, poor lubrication conditions exist, and parts are in intimate contact with a corrosive media, i.e., an acidic product being pumped, blended, conveyed or otherwise handled, or in contact with a cleaning solution or some other detrimental constituent. In many of these applications, especially those involving sanitary requirements for handling food products, it is also necessary for all product contact surfaces to be of a specified non-toxic material. This usually obviates the use of lead, tellurium, and other elements for even minor alloying additions. Additionally, many sanitary requirements, such as those in the dairy industry, do not allow or discourage the use of copper as an alloying element due to objectionable chemical interaction with various product enzymes. These types of requirements drastically limit the available selection of materials for corrosion-wear-sanitary conditions, eliminating entire classes of bearing-type materials; i.e., copper base brasses and bronzes, babbit materials, liquid self-lubricating composites and the like.

Practically, it is overwhelmingly desirable to employ an austenitic stainless steel alloy for at least one element in any mating couple of the foregoing kind due to the wide acceptance of stainless steel in meeting corrosion and sanitary requirements and economy of manufacture.

Austenitic stainless steel, however, when self-mated in most any form of intermittent or continuous metal-to-metal moving contact exhibit a galling tendency in anything less than full hydrodynamic lubrication conditions. Non-lubricated or boundary conditions abound in material coupled used in the above applications; frequently the only lubricant is the handled media itself which can actually be, in certain instances, hostile to the surface interaction condition due to its abrasive and/or corrosive nature.

Prior approaches to this problem have involved three basic actions:

1. Designs to eliminate severe contact through adequate clearancing, loading factors, and the like;
2. Surface coatings, overlays, or treatments of the base materials to provide acceptable surface mating characteristics;
3. Monolithic alloy structures, not necessarily single phase, formed by the normal fabrication methods and which, by composition, provide acceptable self-mating or couple mating with a second component, usually stainless steels.

Of the obviously desirable latter two approaches a well knwon example may be cited, namely, Thomas and Williams U.S. Pat. No. 2,743,176, which teaches the manufacture of a nickel base casting alloy containing bismuth. The resulting alloy provides most of the requirements listed heretofore but poses some disadvantages of castability due to its wide freezing range and the tendency of bismuth to evaporate. The bismuth addition does freeze, although inhomogeneously, as a complex network of elemental bismuth, together with several nickel-bismuth intermetallic phases, through peritectic reaction in the nickel based alloy system, providing exceptional galling resistance when the alloy is mated with austenitic stainless steels, explainable by surface interaction principles related to adhesive wear beyond the scope of this disclosure.

The Thomas and Williams alloy has long been an industry standard. It is employed as a standard for comparison in Lynch et al U.S. Pat. No. 3,671,207 which discloses a composition similar to the Thomas casting alloy for use in a fusion overlay process, with boron and silicon added for hardening and fluxing required for this type of surface deposition, but simultaneously decreasing its machinability. The Lynch technique of physical overlay is limited when parts become complex in shape and contact surfaces become inaccessible or difficult to coat uniformly.

Other alloys of prior art, formed by any of the above mentioned methods of fabrication, generally rely on the use of compositions and phase structures that allow for acceptable self-mating or mating with an alloy other than an austenitic stainless steel. Examples are the nickel base alloys of Johnson U.S. Pat. No. 2,930,786, and the iron base alloys of U.S. Pat. No. 3,912,503. In most every instance, these materials will gall badly when mated with austenitic stainless steels at the loading stress, surface velocity, and lubrication conditions commonly encountered in the equipment of interest.

OBJECTS AND SUMMARY OF THE INVENTION

The primary object of this invention, then, is to provide a material and method for forming shaped, structural parts for use in machinery elements requiring a combination of corrosion resistance, non-toxicity of composition with respect to food and drug sanitary requirements, wear resistance, and non-galling behavior when mated with other metal parts, especially austenitic stainless steels. Other objects of the invention are to increase the wear resistance of such parts and to enhance the amount of bismuth-rich phases at the wearing surface compared to the aforementioned industry standard.

Stainless steels, when self and otherwise mated in sliding contact, tend to gall or heavily score under most geometrical and loading conditions encountered in common designs (pumps, valves, actuators, etc.) as already noted. This invention provides an economical material and process for preparing structural parts which possess the desirable aspects of stainless steel, but is superior in surface mating characteristics when self-mated or performing as one element in a couple in which the other element is an austenitic stainless steel. This material is prepared by the following novel process, by which one is able to incorporate a large amount of bismuth and bismuth rich phases in an iron base matrix, heretofore unattainable by casting and wrought methods of manufacture because of limited solubility in both liquid and solid states, and catastrophic effects on mechanical properties. The following sequence constitutes a preferred practice:

A. conventional austenitic 18 Cr, 8Ni type stainless steel powder, produced by well known commercial methods, is compacted under high pressure (about 50 TSI) in a die or mold cavity to a desired shape, and then sintered by conventional powder metallurgy techniques preferably in a vacuum-type protective atmosphere so that the resultant part has a controlled amount of porosity, from 5 to 20 percent, with maximization of interconnected (as opposed to isolated) porosity at the surface.

B. The compacted shape may be subjected to heat treating, cleaning, machining or finishing operations at this stage, or after the following major step in processing.

C. The compacted and sintered part is submerged in and impregnated with molten bismuth or a bismuth alloy contained in a closed vessel in order to fill the porosity or a portion of the porosity adjacent to the external surface by evacuation of the contained atmosphere; positive pressure may be used to assist in filling the pores, about 175 psig.

D. The impregnated part is finished as by machining or blasting in order to obtain the desired dimensions and surface condition.

Composition: The stainless steel need not be specifically 18 Cr, 8Ni; other types of stainless may be used. The alloy may contain more or less nickel, especially if acceptable in food machinery. In particular, however, the stainless steel base is economical and is approved for food machinery. The infiltrating bismuth may be alloyed with another element (notably tin) to lower infiltration temperature through eutectic suppression of the melting point, and to aid in wettability.

Process: The vacuum step may be eliminated if a pressure gradient can be applied across the part. The part may be submerged before applying the pressure differential. Pressure and vacuum times, immersion levels and infiltrant composition and temperature can be modified to control the quantity and quality of impregnated pores.

The material and the process have many advantages in comparison to the cast alloy made according to U.S. Pat. No. 2,743,176, notably savings from bismuth conservation (stack losses in melting) and in the low cost ferrous metal base. Also, wear performance is superior to the cast alloy and to the stainless steel base alloy made according to U.S. Pat. No. 3,912,503.

EXAMPLE 1

Figure 1:
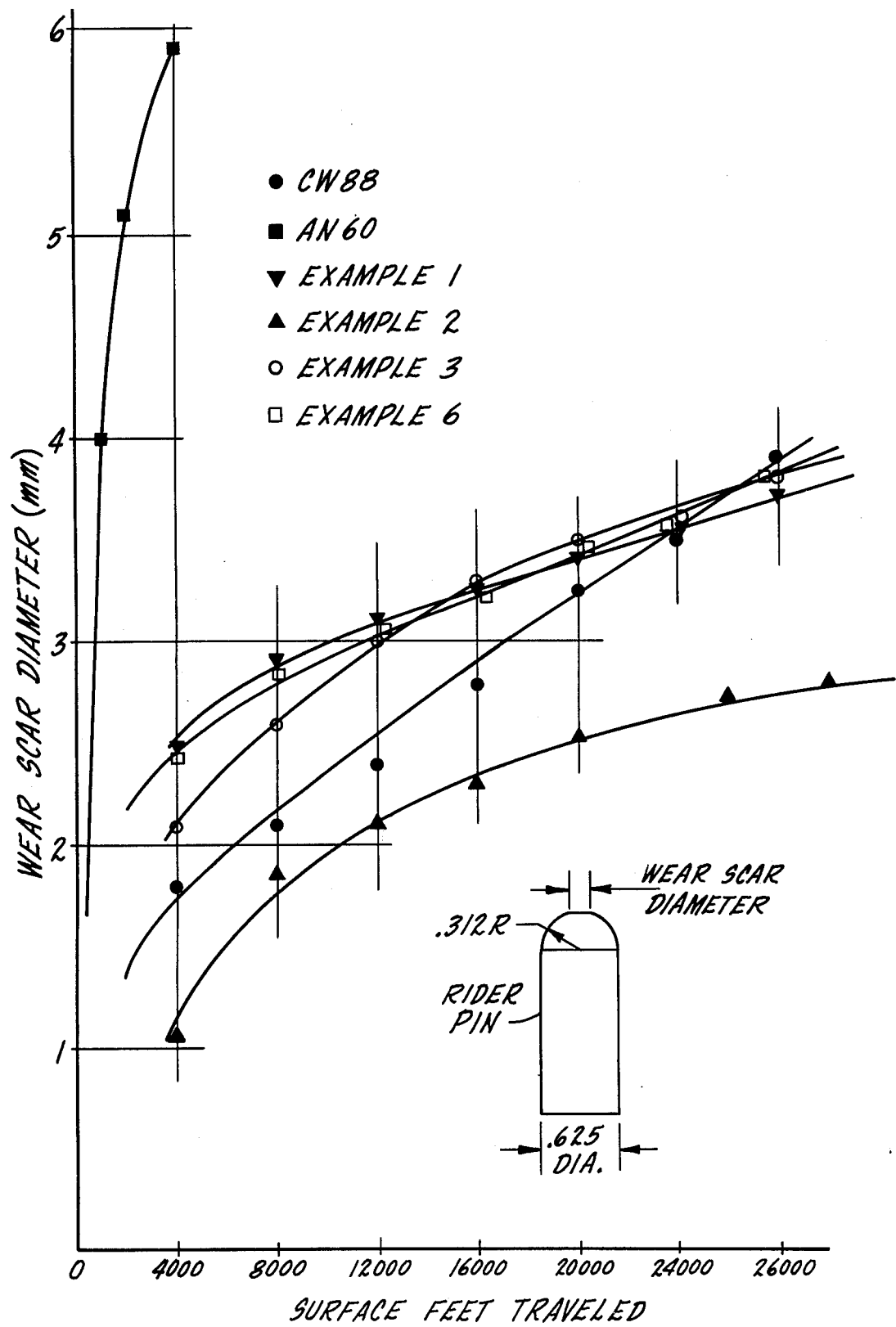
FIG. 1 is a graph showing wear vs. surface speed travelled for test parts.

Stainless steel powder of 316L type composition was pressed and subsequently sintered at 2060° F. for 45 minutes in a dissociated ammonia atmosphere, resulting in an as-sintered density of 6.69 g/cm$^3$. The material was then vacuum-pressure impregnated by the "wet" method with commercially pure elemental bismuth, that is, a vacuum was drawn after the sintered material was submerged in liquid bismuth, the vacuum released after a period of time, and a pressure applied for an additional duration. The bismuth bath was at 1100° F. at the start of the vacuum cycle and cooled to approximately 600° F. after the pressure cycle before withdrawing the sintered material. Vacuum was 28 inches of Hg for twenty minutes, pressure was 175 psig for five minutes.

EXAMPLE 2

Samples were prepared in accordance with Example 1, except that as-sintered density of the stainless steel material was 6.88 g/cm$^3$.

EXAMPLE 3

Samples were prepared in accordance with Example 1, except that samples were vacuum pressure impregnated by the wet method with a bismuth-tin eutetic composition (58 weight percent bismuth, 42 weight percent tin).

EXAMPLE 4

Samples were prepared in accordance with Example 1, except that as-sintered density was 6.67 g/cm$^3$ and as-sintered slugs were machined to near-final part dimensions for a rotary positive displacement sanitary pump twin lobed rotor, electropolished to remove surface burnishing effects from machining, vacuum-pressure impregnated by the "wet" method with commercially pure elemental bismuth in accordance with the process parameters of Example 1, then machined to final part dimensions.

EXAMPLE 5

Samples were prepared in accordance with Example 4, except that the as-sintered density of the slugs was 6.88 g/cm$^3$, as in Example 2.

EXAMPLE 6

Stainless steel powder of 316L type composition was pressed and subsequently sintered at 2150° F. for 45 minutes in vacuum, resulting in an as-sintered density of 6.69 g/cm$^3$. The material was then vacuum-pressure impregnated by the "dry" method with commercially pure elemental bismuth, that is, a vacuum is drawn on the material, liquid bismuth is then introduced, submerging the part while the vacuum is retained, and finally vacuum is released and a pressure applied. The bismuth bath was maintained at a near constant 850° F. through constant heating of the pressure vessel apparatus used. Vacuum was 28 inches of Hg before introducing bismuth, the vacuum was released immediately after the sintered material was totally submerged, and a pressure of 175 psig was applied for five minutes.

EXAMPLE 7

Samples were prepared in accordance with Example 6, with the exception that as-sintered slugs were machined to near-final part dimensions for a rotary positive displacement sanitary pump twin lobed rotor, electropolished to remove surface burnishing effects from machining, vacuum-pressure impregnated by the dry method with commercially pure elemental bismuth in accordance with the process parameters of Example 6, then machined to final part dimensions.

EXAMPLE 8

Samples were prepared in accordance with Example 5 after which the impregnated parts were machined to final dimensions for a rotary positive displacement sanitary pump lobed rotor.

EXAMPLE 9

Rotary positive displacement sanitary pump rotor nuts were prepared in accordance with Example 7.

EXAMPLE 10

Rotary positive displacement sanitary pump rotor nuts were prepared in accordance with Example 8.

The degree of impregnation for all examples is shown in Table I:

TABLE I

| Example | Item | Impregnation Method (wet or dry) | As-Sintered* Density (g/cc) | Total* Porosity (volume %) | Porosity Filled (% of total) |
|---|---|---|---|---|---|
| 1 | Test metal | wet | 6.69 | 13.7 | 51 |
| 2 | Test metal | wet | 6.88 | 11.2 | 39 |
| 3 | Test metal | wet | 6.66 | 14.1 | 54 |
| 4 | Pump rotor | wet (after rough machining and electropolish) | 6.67 | 13.9 | 43 |
| 5 | Pump rotor | wet (after rough machining and electropolish) | 6.88 | 11.2 | 26 |
| 6 | Test metal | dry | 6.69 | 13.0 | 86 |
| 7 | Pump rotor | dry (after rough machining and electropolish) | 6.76 (6.70) | 12.8 (13.5) | 66 |
| 8 | Pump rotor | dry (machined after impregnation) | 6.76 | 12.8 | 99 |
| 9 | Rotor nuts | dry (after rough machining and electropolish) | 6.79 (6.70) | 12.4 (13.5) | 73 |
| 10 | Rotor nuts | dry (machined after impregnation) | 6.79 | 12.4 | 93 |

*Number in parentheses indicates values after electropolish; % porosity filled in these examples is based on aselectropolished porosity and density.

The values for percent porosity presented in Table I definitely indicate increased levels of impregnation using the dry method. However, the depth of penetration from the surface is readily controlled by the wet method, principally by adjusting vacuum cycle times. Surface interconnected porosity is entirely filled by both methods in this invention, providing sound, porosity free parts for sanitary application. Since the wet process promotes impregnation only to a certain depth from the surface, this can be used to advantage in material conservation when impregnating parts in a configuration close to the final desired shape. The dry process, on the other hand, more readily will serve to impregnate an entire slug throughout its cross section, but can be modified by adjusting principally vacuum and pressure levels and pressure cycle time to control depth.

Examples 7 through 10 exhibit the surface burnishing effects of machining porous surfaces before impregnating, which reduces bismuth alloy impregnation levels, even when electropolishing has been employed to remove gross effects to re-expose surface porosity. Indeed, non-electropolished samples exhibit no penetration at all within the range of the processing parameters referenced in the examples. The most desirable form for impregnation is an as-pressed and sintered powder metallurgy part, although some decreased efficiency of impregnation can arise along vertical die-wall formed surfaces which are burnished during mechanical pressing by entry type punch and die tooling. A part pressed to near final dimension, impregnated in the as-sintered form, and subsequently machined, if needed, to achieve dimensional tolerance levels required, as in Example 8 and 10, constitutes the preferred embodiment of this invention. An additional benefit of this invention, realized fully by this preferred method, is that impregnating with bismuth alloys greatly increases the machinability of the parts.

Table I also indicates the effect of as-sintered density on the percent of porosity filled. As as-sintered density is increased, overall volume porosity is obviously decreased in powder metallurgy parts but more importantly the percentage of the total porosity which is surface interconnected decreases as isolated porosity percentage rises. The percentage of isolated porosity increases sharply for most commercially used stainless steel powders and green compaction pressures used for densities over about 95% of theoretical full density (around 7.4 g/cc). Thus, this invention applies primarily to densities of 95% or less (5 to 20% inter-connected porosity) in order to minimize non-surface connected porosity which may be sectioned and become surface pores when final machining operations are required: Corresponding preferred density, 6.2/7.4 grams/cc.

The drawing (graph) reveals how density levels affect wear resistance of this material when run in surface contact with austenitic stainless steels. These data suggest that a material be employed in which the as-sintered density is maximized to a point where closed or isolated porosity starts increasing. The wear data for examples in which the wet method of impregnation was used is for fully impregnated areas of the test metal, i.e., not beyond the depth of impregnation.

Also shown in the graph are comparative data for other existing alloys intended for this type of service, clearly showing the superiority of the present material.

The data presented in the drawing were obtained by tracking the rider pin on a 316 stainless steel plate rotating at 100 rpm in water of room temperature. The plate had a 7.75" diameter wear path equivalent to sixty-six feet/minute speed. The force applied to the pin was 2600 grams.

The composition and density for test pins (rider pin) conforming to the present invention are given in Examples 1, 2, 3 and 6.

Test pin CW 88 is based on U.S.A. Pat. No. 2,743,176. Test pin AN 60 represents another commercial cast alloy intended for the kind of service here involved. These pins had the following configurations:

|  | CW 88 | AN 60 |
|---|---|---|
| C | 0.01 | 0.074 |
| Mn | 0.78 | 8.11 |

-continued

|  | CW 88 | AN 60 |
| --- | --- | --- |
| Si | 0.19 | 3.90 |
| Cr | 13.20 | 16.98 |
| Mo | 2.38 |  |
| Bi | 3.39 |  |
| Sn | 3.95 |  |
| N |  | 0.11 |
| Fe | 0.54 | Balance |
| Ni | Balance | 8.38 |

The rotors and rotor nuts prepared in Examples 4, 5, 8, 9 and 10, were subjected to in-service testing in positive displacement rotary pumps, all resulting in satisfactory performance, i.e., no visible signs of galling in cases of rubbing contact with other austenitic stainless steel pump parts or other operational difficulties. The rotor manufactured according to Example 4 operated in a close tolerance pump under test conditions at maximum allowable operating head pressure for over 94 million cycles.

The stainless steel base is not only economical, it also represents a metal having no mutual solubility with bismuth. Accordingly, it is possible, literally, to load the interconnected porosity with substantially pure bismuth (or bismuth-tin) eutectic) in an amount of at least five percent by weight, thereby achieving a greater bismuth content, and without experiencing bismuth segregation, contrary to the apprehensions specified in U.S. Pat. No. 2,743,176.

Figure 2:
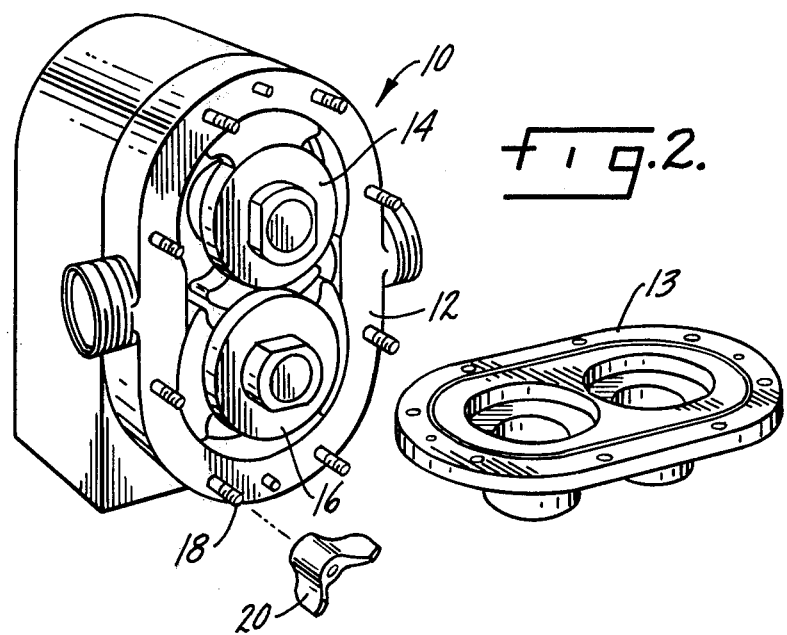
FIG. 2 is a perspective view of pump parts in which the present invention may be embodied.

Typical equipment in which the invention may be embodied is shown in FIG. 2 which depicts a rotary positive displacement pump 10 for food processing. The stator 12 and face plate 13 may be standard cast stainless steel and the rotors 14 and 16 opposed thereto may be composed in accordance with Example 8 or any of the other examples; the threaded studs 18 may be standard stainless steel parts but the related wing nuts 20 for securing the face plate to the stator may be powdered metal parts in accordance with the present invention. The opposed standard, stainless steel part may be wrought rather than cast in some instances.

We claim:

1. In a machine in which opposed members are in contact with one another: one of said members being of compacted sintered powdered stainless steel having a density appreciably less than theoretical density so that the porosity which remains is substantially interconnected, and said one member having a portion of its porosity, commencing at an outer surface and extending inward thereof, impregnated with a metal selected from the group consisting of bismuth and a low friction bismuth-rich alloy.

2. In a machine according to claim 1, the other member being entirely of stainless steel, cast or wrought.

3. In a machine according to claim 1, the powdered stainless steel being compacted to a density in the range of about 6.2/7.4 grams/cc.

4. In a machine according to claim 1, the other member being entirely of stainless steel and the two members being incorporated in a rotary pump.

5. A machine part having a surface to be mated to an opposing part, and being fabricated as a compacted sintered powdered stainless steel part of appreciably less than theoretical density thereby to retain interconnected porosity, and impregnated for a portion of its thickness, commencing with and extending inward from an outer surface, with a metal selected from the group consisting of bismuth and a low friction bismuth-rich alloy.

6. A machine part according to claim 5 which is a pump rotor or a part adjacent the rotor.

7. A machine part according to claim 6 in which the sintered metal has a density in the range of about 6.2/7.4 grams/cc.

* * * * *